(12) United States Patent
Ouchi

(10) Patent No.: US 6,259,813 B1
(45) Date of Patent: Jul. 10, 2001

(54) METHOD AND APPARATUS FOR IMAGE PROCESSING USING A SIGNAL OF MULTIPLE SCALE VALUES

(75) Inventor: Satoshi Ouchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/276,157

(22) Filed: Mar. 25, 1999

(30) Foreign Application Priority Data

Mar. 27, 1998 (JP) .................................................. 10-081228
Feb. 25, 1999 (JP) .................................................. 11-048886

(51) Int. Cl.[7] ..................................................... G06K 9/66
(52) U.S. Cl. ............................................................ 382/195
(58) Field of Search ...................................... 382/195, 196, 382/197, 198, 199, 200, 165, 201, 217, 177, 203, 206

(56) References Cited

U.S. PATENT DOCUMENTS

| 4,567,610 | * | 1/1986 | McConnell | ............................. 382/18 |
| 5,515,451 | * | 5/1996 | Tsuji et al. | ............................. 382/135 |
| 5,617,485 | | 4/1997 | Ohuchi et al. . | |
| 5,845,008 | * | 12/1998 | Katoh et al. | ............................. 382/217 |
| 5,850,298 | | 12/1998 | Narahara et al. . | |

* cited by examiner

*Primary Examiner*—Andrew W. Johns
*Assistant Examiner*—Seyed Azarian
(74) *Attorney, Agent, or Firm*—Oblon, Spivak, McClelland, Maier & Neustadt, P.C.

(57) ABSTRACT

An image processing apparatus includes an image data input mechanism which allows an input of image data and processes input image data in a unit of pixels. A determination mechanism analyzes and determines whether surrounding pixels close to an object pixel are part of a character area. A calculation mechanism calculates a distance value from the object pixel to the surrounding pixels determined as part of the character area by the determination mechanism. A signal output mechanism outputs a multiple value signal representing a feature of the object pixel as a character based on the distance value calculated by the calculation mechanism.

30 Claims, 4 Drawing Sheets

FIG. 3
16 X
| -1 | -1 | -8 | -1 | -1 |
|----|----|----|----|----|
| 0  | 0  | 40 | 0  | 0  |
| -0 | -0 | -8 | -0 | -0 |
FIG. 4A
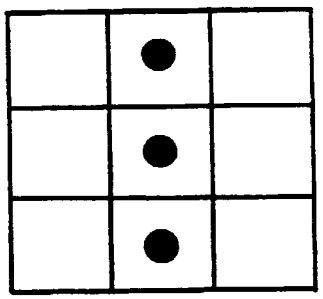
FIG. 4B
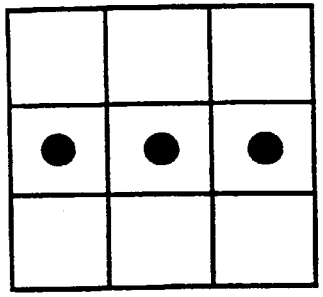
FIG. 4C
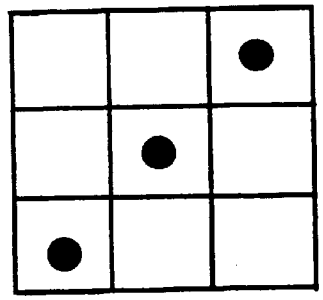
FIG. 4D
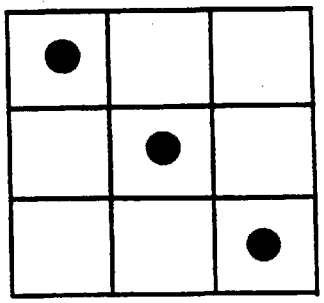
FIG. 5
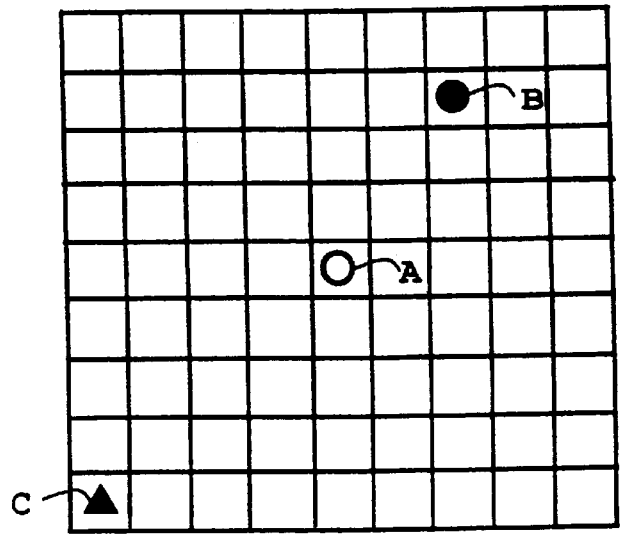

METHOD AND APPARATUS FOR IMAGE PROCESSING USING A SIGNAL OF MULTIPLE SCALE VALUES

BACKGROUND OF THE INVENTION

1. Field of the Invention

This invention relates to a method and apparatus for image processing, and more particularly to a method and apparatus for image processing that extracts characteristics of an image and generates an image signal having multiple scale values in accordance with the extracted characteristics.

2. Discussion of the Background

In general, an image processing apparatus in use for various image handling apparatuses, such as a digital copying machine, a facsimile machine, and so forth, has been provided with a data handling operation that separates an original image having a mixture of characters and patterns into a plurality of image areas in accordance with types of images as determined with detailed analysis of the original image. This background apparatus then switches to an appropriate image processing operation according to the image type to appropriately process each separated image area. For example, Japanese Laid-Open Patent Publication No. JPAP03-089677 (1991) describes a technique for emphasizing a contrast of characters in black, in particular, by switching a spatial filter, a gamma conversion, a screening, and so forth, to process each image area of a non-character (non-active) edge, a colored-character edge, an intermediate-chroma character edge, or a black character edge. As another example, Japanese Laid-Open Patent Publication Nos. JPAP07-108019 and JPAP06-018439 (1994) describe a technique that generates a specific signal having multiple scale values for representing an edge of a character, as illustrated in FIG. 8. FIG. 8 illustrates a relationship between density scales of an edge and an immediately adjacent background, wherein the letter A indicates an edge of a character and the letter X indicates an area of an immediately adjacent background which can be analyzed relative to the edge A. Accordingly, this technique switches an image processing operation at multiple levels in accordance with the multiple scale values of the generated specific signal.

However, the technique of JPAP03-089677 has a drawback that a quality of an image deteriorates when the image has a sharply changed texture or when an erroneous image separation is made. This deterioration of image quality is due to a method of image separation using only binary scale values of 0 and 1 which may be insufficient to judge each image area. Also, the techniques of JPAP07-108019 and JPAP06-018439 have drawbacks that factitious marks remain around edges in the image caused by switching of the image processing operations, although the switching is conducted at the multiple levels and deterioration of an image is therefore decreased to a certain extent. As illustrated in FIG. 8, the reason for this drawback is that since this technique can use a 5-by-5 pixel filter at best, an area X of an immediately adjacent background which can be analyzed relative to the edge is relatively narrow.

SUMMARY OF THE INVENTION

Accordingly, an object of the present invention is to provide a novel image processing apparatus which is capable of realizing reproducibility of both a resolution-oriented image area, such as edges of a character and a pattern, and a gray-scale-oriented image area, such as a pattern.

Also, another object of the present invention is to provide a novel image processing method which is capable of realizing reproducibility of both a resolution-oriented image area, such as edges of a character and a pattern, and a gray-scale-oriented image area, such as a pattern.

To achieve these and other objects, a novel image processing apparatus of the present invention includes an image data input mechanism which allows an input of image data and processes input image data in a unit of pixels. A determination mechanism analyzes and determines whether surrounding pixels close to an object pixel are part of a character area. A calculation mechanism calculates a distance value from the object pixel to the surrounding pixels determined as part of the character area by the determination mechanism. Further, a signal output mechanism outputs a multiple value signal for representing a feature of the object pixel as a character based on the distance value calculated by the calculation mechanism.

A density decreasing mechanism may be added to decrease an original density of the input image data to a predetermined density immediately after the input image data is input through the image data input mechanism. Also, a density increasing mechanism may be added to increase the predetermined density of the output image data back to the original density.

The signal output mechanism may calculate the distance value using a formula $V=255-(255 \times D/6)$, wherein $V$ is a density value of the object pixel and $D$ is a distance from the object pixel to a peripheral pixel determined as part of the character area by the determination mechanism.

The character area may include a part which is a cluster area of a black pixel, or which is an edge area, or which is a ridge area of a character.

The novel image processing method of the present invention includes the steps of inputting image data, processing the input image data in a unit of pixels, analyzing and determining whether surrounding pixels close to an object pixel are part of a character area, calculating a distance value from the object pixel to the surrounding pixels determined as part of the character area by the determination step, and outputting a multiple value signal for representing a feature of the object pixel as a character based on the distance value calculated by the calculation step.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is an illustration for explaining a 5-by-5 pixel matrix for detecting a feature of a character;

FIGS. 4A–4D are illustrations for explaining filters for detecting bar-shaped consecutive active pixels as a feature of a character;

FIG. 5 is an illustration for explaining a distance value between an object pixel and surrounding pixels in a matrix;

DESCRIPTION OF THE PREFERRED EMBODIMENTS

Figure 1:
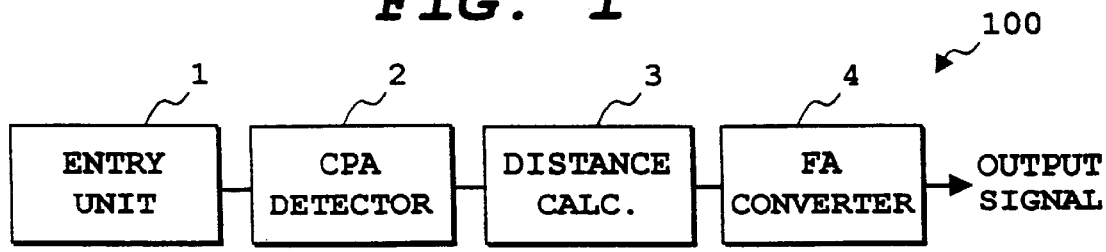
FIG. 1 is a block diagram of an image processing apparatus according to an embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, an image processing apparatus 100 according to an exemplary embodiment of the present invention is illustrated. The image processing apparatus 100 of FIG. 1 includes an entry unit 1, a character pixel area (CPA) detector 2, a distance calculator 3, and a feature amount (FA) converter 4. The entry unit 1 includes a scanner (not shown) using a CCD (charge coupled device) that reads an original image and generates an analog signal which is then converted into an 8-bit digital image signal linearly expressing a density of each pixel with a value varying from 0 to 255.

The CPA detector 2 analyzes the 8-bit digital image signal from the entry unit 1 and generates a signal that indicates whether an object pixel is part of a character area. The details of the CPA detector 2 are explained with reference to the following four variations illustrated in FIGS. 2A–2D.

Figure 2A:
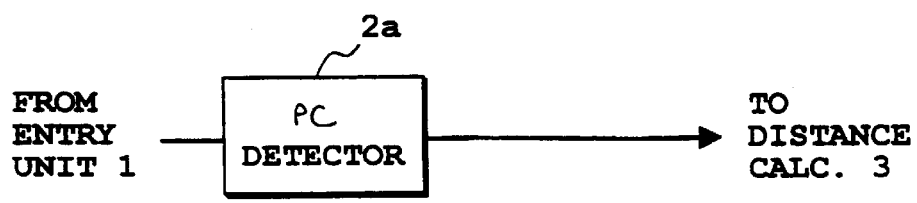
FIGS. 2A–2D are illustrations for explaining different examples of a CPA detector of the image processing apparatus of FIG. 1.

A pixel cluster (PC) detector 2a of FIG. 2A is a first example of the CPA detector 2, and uses such a feature of characters that the pixels of high density exist in a form of a bar-shaped cluster so as to detect pixels of a character.

More specifically, the PC detector 2a first performs, as a pre-treatment, an edge enhancing filtering for filtering pixels, including an object pixel and other pixels surrounding the object pixel, of an image signal from the entry unit 1 with an enhancing coefficient of 16, for example, and a 5-by-5 pixel filter, for example, as illustrated in FIG. 3. Then, the PC detector 2a compares the resultant values of the object pixel and the surrounding pixels with a predetermined threshold value so as to determine whether each of the object pixel and the surrounding pixels is a black pixel or not. A stroke formed by the black pixels including the object pixel and the surrounding pixels is subjected to a pattern matching with various strokes such as vertical, horizontal, slash-like, and reverse-slash-like strokes, as shown in FIGS. 4A–4D, respectively. Thereby, the PC detector 2a can detect a pixel cluster which forms a black bar.

Figure 2B:
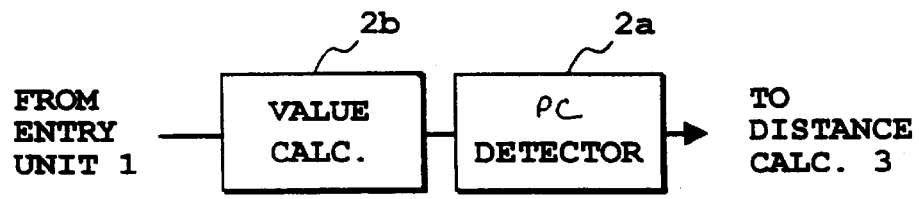

A second example of the CPA detector 2 is illustrated in FIG. 2B. This example is used when the image signal from the entry unit 1 is a color image signal, and includes a minimum value calculator 2b before the PC detector 2a. The minimum value calculator 2b calculates a minimum value of R (red), G (green), and B (blue) elements of the color image signal, and outputs an image signal based on the minimum value to the PC detector 2a. Then, the PC detector 2a analyzes the output image signal from the minimum value calculator 2b to detect a pixel cluster which forms a black bar in the ways as described above.

Figure 2C:
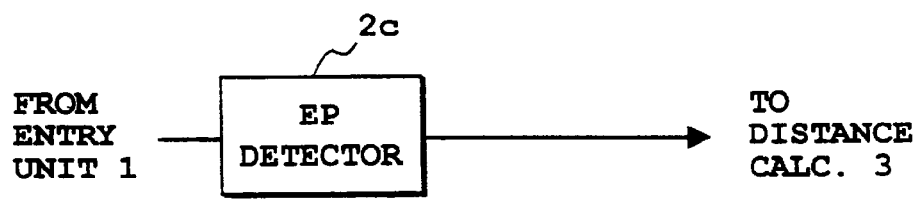

A third example of the CPA detector 2 is illustrated in FIG. 2C as an edge pixel (EP) detector 2c. The EP detector 2c detects an edge of characters using a pattern matching for finding seriality of black pixels and white pixels on a character edge area. Specifically, the EP detector 2c uses such a feature of characters that in a character edge area there exist black pixels connected in series and white pixels connected in series so as to detect whether the object pixel is part of a character edge or not. The details of this detection are described in Japanese Laid-Open Patent Publication No. JPAP02-292957 (1990), the entire contents of which are hereby incorporated by reference. Other known methods than this technique may also be used to detect whether the pixels are part of a character.

Figure 2D:
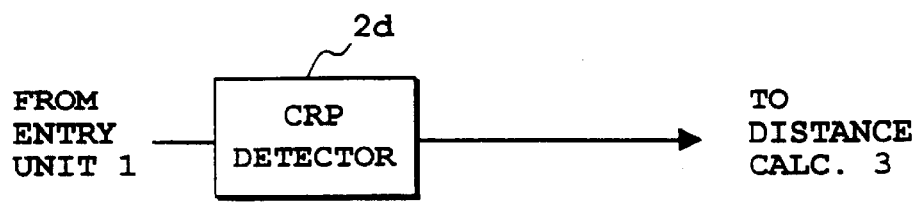

A fourth example of the CPA detector 2 is illustrated in FIG. 2D in which the CPA detector 2 is a character ridge pixel (CRP) detector 2d. The CRP detector 2d detects a ridge of characters using a pattern matching for finding a ridge-like form of pixels on a character edge area. That is, the CRP detector 2d uses such a feature of characters that in a middle of a character there exist black pixels in series having stepped values so as to detect whether the object pixel is part of a character or not. The details of this detection are described in Japanese Laid-Open Patent Publication No. JPAP02-123479 (1990), the entire contents of which are hereby incorporated by reference. Other known methods than this technique may also be used to detect whether the pixels are part of a character.

In FIG. 1, the distance calculator 3 calculates and outputs a value indirectly proportional to a distance from the object pixel to a pixel which has been determined as part of a character based on the information detected by the CPA detector 2 as to whether the object pixel is part of a character (active pixel) or part of non-character (non-active pixel). In this operation, the output value from the distance calculator 3 becomes greater when an active pixel is located at a position closer to the object pixel.

As shown in FIG. 5, a 9-by-9 pixel matrix is preferably used for this operation, for example. Assume that the object pixel indicated by letter A is located at the center, and active pixels indicated by letters B and C have their respective distances to the object pixel A. These distances can be calculated using a formula $D=\sqrt{(x^2+y^2)}$ wherein D is the distance, and x and y are the relative positions (x, y) of the active pixel B or C to the position of the object pixel as a point of origin (x=0, y=0).

After calculating these distances, the distance calculator 3 selects the smallest value from among the calculated distances. The active pixel having the smallest distance value is the nearest active pixel relative to the object pixel A. In the case as shown in FIG. 5, the nearest active pixel is the active pixel B. With the resultant distance value D, the distance calculator 3 further calculates a value V of the object pixel A using a formula V=255−255×D/6. By this formula, the value V becomes approximately 0 when the nearest active pixel is located on a perimeter of the 9-by-9 pixel matrix, and increases as the active pixel becomes closer to the object pixel. The reason for dividing the distance D with 6 in the formula of V is as follows. A distance from the position of origin to a pixel on a perimeter of the matrix is a value of 5 pixels in the horizontal or vertical direction or a value of approximately 7 pixels in the diagonal direction. As a mean value of these 5 and 7 pixels, 6 is predetermined so as to set the value V to approximately 0 when an active pixel is located on a perimeter of the 9-by-9 pixel matrix.

The FA converter 4 converts the value V of the object pixel, output from the distance calculator 3, into a value representing an amount of a feature of the object pixel, using a reference table (e.g., a gamma conversion table). By this operation, the image processing apparatus 100 can provide a certain flexibility with respect to the relationships between the amount of the feature and each data processing operation that controls the amount of the feature. More specifically, such an operation allows the operator to select a preferable gamma from among a plurality of gamma conversion tables previously stored in the FA converter 4. For this purpose, the plurality of gamma conversion tables include an S-shaped gamma conversion table, for example, for performing a non-character deformation operation on a pixel which likely represents part of a character to some extent so as to perform a character deformation operation on a pixel truly representing part of a character when the image shows features of characters. In addition, the FA converter 4 may perform a quantization operation.

Figure 6:
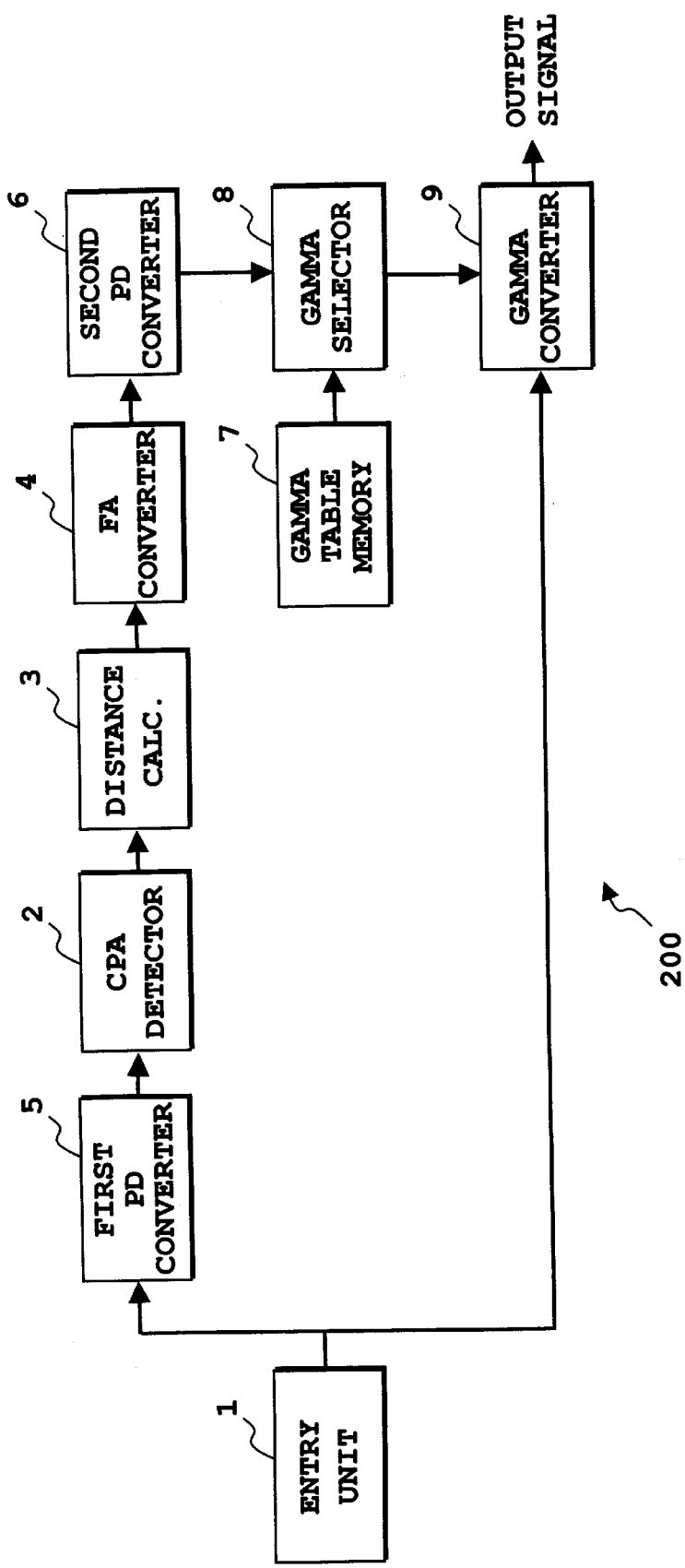
FIG. 6 is a modified image processing apparatus according to an embodiment of the present invention.
Figure 7:
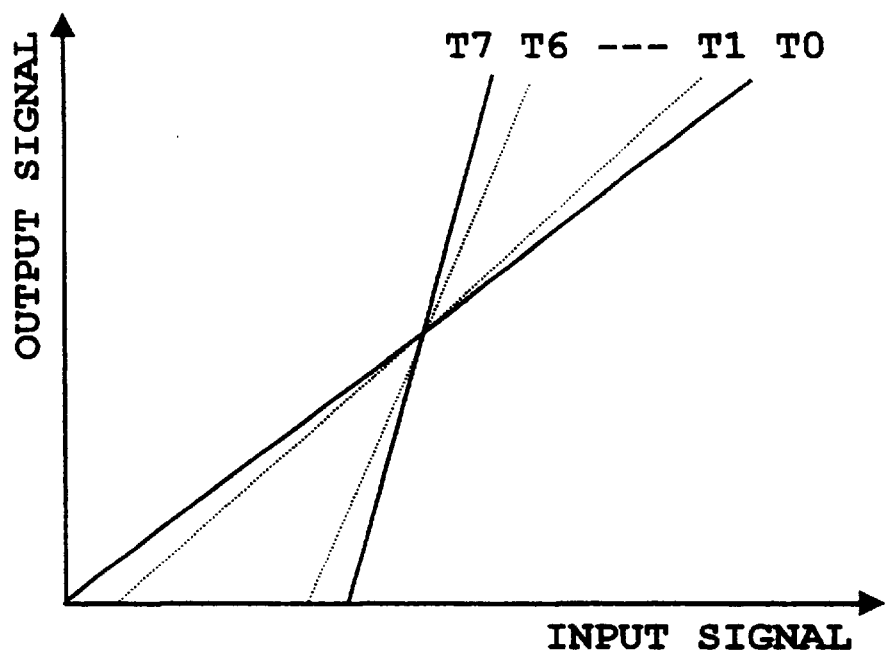
FIG. 7 is a graph for explaining a set of previously provided gamma tables representing data having different gamma lines.
Figure 8:
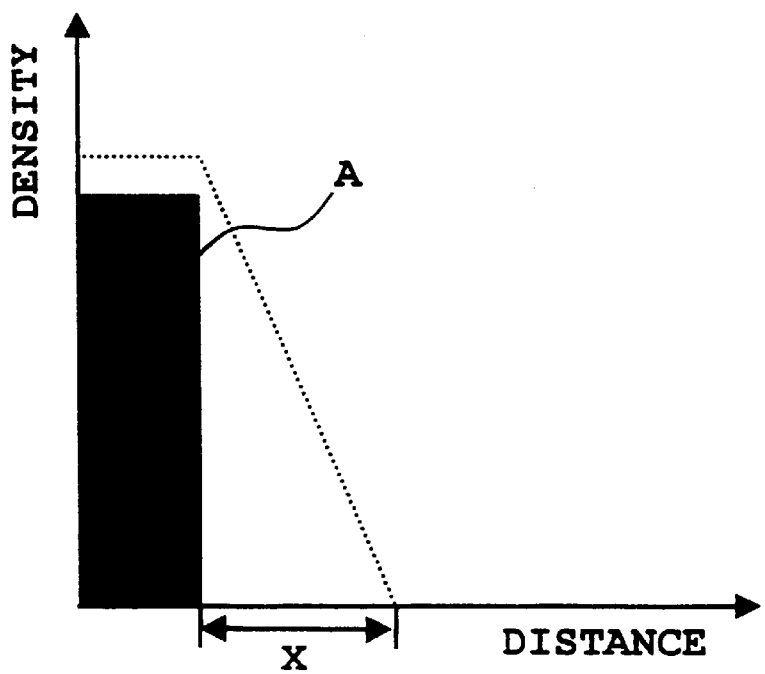
FIG. 8 is a graph for explaining a relationship between density and pixels including an object pixel and immediately adjacent pixels.

Next, a modification of the image processing apparatus 100 is explained with reference to FIGS. 6 and 7. FIG. 6 shows a block diagram of a modified image processing apparatus 200. The modified image processing apparatus 200 includes the entry unit 1, the CPA detector 2, the distance calculator 3, and the FA converter 4, which perform the same functions as in the image processing apparatus 100. The modified image processing apparatus 200 further includes a first pixel density (PD) converter 5, a second pixel density (PD) converter 6, a gamma table memory 7, a gamma selector 8, and a gamma converter 9.

The first PD converter 5 decreases the density of pixels received from the entry unit 1 and outputs the resultant signal to the CPA detector 2. Such a first PD converter 5 may be, as one example, configured with a simple circuit for thinning signals. The CPA detector 2 analyzes the pixels having the decreased density and generates a signal that indicates whether an object pixel is part of a character area. The distance calculator 3 calculates and outputs the value V of each object pixel based on the signal from the CPA detector 2. The FA converter 4 converts the value V of each object pixel into feature amounts using the reference table. The second PD converter 6 returns the density of the pixel back to its original state and outputs the resultant signal to the gamma selector 8. Such a second PD converter 6 may, as an example, be configured with a simple circuit for automatically writing data twice.

The reason for including an operation of reducing a density of pixels in the above operation is as follows. A method for judging an image based on pixel level information is prone to involve an erroneous judgement, resulting in an inferior quality of an image. In order to avoid this problem, a technique for performing the judgement in multiple levels has been developed. However, this technique has brought a relatively small effect with respect to the above problem since an area where the multiple-level judgement is introduced is basically narrow, or the pixel level. As a result, the deformation with such a multiple-level judgement appears to be factitious to the human eyes. Generally, this problem becomes distinguished as the integration of the memory device advances. Performing the multiple-level judgement based on a relatively large-sized matrix may be one solution. However, this solution has a disadvantage. This operation would cause the image processing apparatus 200 to increase a number of line buffers (not shown) for buffering the relatively large-number of pixel lines for forming the above large-sized matrix. As an alternative technique to avoid the above-mentioned problem and disadvantage, reduction of pixel density is adapted in the above operation. That is, in the present invention as shown in FIG. 6, operations are performed for detecting features of pixels in a density lower than the original density and returning to the original density after the judgement whether the object pixel is part of a character or not is completed.

The gamma table memory 7 stores a plurality of gamma tables T0–T7, for example. These gamma tables T0–T7 represent gamma lines having different angles from each other, as illustrated in FIG. 7. The gamma table T7 represents a gamma line having the greatest angle and is therefore suitable to be used for characters, while the gamma table T0 represents a gamma line having the smallest angle and is therefore suitable to be used for patterns. Accordingly, as the output signal from the second PD converter 6 becomes greater, a gamma table with the greater gamma angle is selected by the gamma selector 8. Then, the gamma converter 9 uses one of the gamma tables T0–T7 selected by the gamma selector 8 to convert the gamma of the image signal sent from the entry unit 1, as shown in FIG. 6.

In the block diagram of FIG. 6, when the number of the prepared gamma tables is 8, as described above, the FA converter 4 performs the conversion by quantizing the amount of feature of a pixel into 3-bit-data.

In addition, the gamma converter 9 may output an image signal in the same bit configuration when an image output machine such as a printer located at a stage following the image processing apparatus 200 outputs an image signal with a gray-scale in an 8-bit configuration. However, when the output gray-scale from the image output machine is smaller than 8, the gamma converter 9 may quantize 8-bit data of the image signal so as to fit to the bit number of the output gray-scale, or the gamma tables T0–T7 of the gamma table memory 7 may be configured to output data having a reduced number of bits so as to be suited to the output gray-scale.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This document is based on Japanese Patent Application Nos. JPAP 10-081228 and JPAP11-048886 filed in the Japanese Patent Office on Mar. 27, 1999, and Feb. 25, 1999, respectively, the entire contents of which are hereby incorporated by reference.

What is claimed is:

1. An image processing apparatus, comprising:
image data input means for receiving input image data and processing the input image data in a unit of pixels;
determination means for analyzing and determining whether surrounding pixels close to an object pixel are part of a character area;
calculation means for calculating a distance value from said object pixel to said surrounding pixels determined as part of said character area by said determination means; and signal output means for outputting a multiple value signal for representing a feature of said object pixel as a character based on said distance value calculated by said calculation means.

2. An image recognition apparatus as defined in claim 1, further comprising:
density decreasing means for decreasing an original density of said input image data to a predetermined density after said input image data is input through said image data input means; and
density increasing means for increasing said predetermined density of said output image data back to said original density.

3. An image recognition apparatus as defined in claim 1, wherein said signal output means calculates said distance value using a formula V=255−(255×d/6), wherein V is a density value of said object pixel and d is a distance from said object pixel to said peripheral pixel determined as part of said character area by said determination means.

4. An image recognition apparatus as defined in claim 1, wherein said character area includes a part which is a cluster area of a black pixel.

5. An image recognition apparatus as defined in claim 1, wherein said character area includes a part which is an edge area.

6. An image recognition apparatus as defined in claim 1, wherein said character area includes a part which is a ridge area of character.

7. An image processing system, comprising:
image recognition means for analyzing input image data, recognizing a characteristic of an image represented by said input image data, and outputting output image data; and
data processing means for processing output image data in accordance with said recognized characteristic,
wherein said image recognition means includes:
image data input means for receiving input image data and processing the input image data in a unit of pixels;
determination means for analyzing and determining whether surrounding pixels close to an object pixel are part of a character area;
calculation means for calculating a distance value from said object pixel to said surrounding pixels determined as part of said character area by said determination means; and
signal output means for outputting a multiple value signal for representing a feature of said object pixel as a character based on said distance value calculated by said calculation means.

8. A system as defined in claim 7, further comprising:
density decreasing means for decreasing an original density of said input image data to a predetermined density after said input image data is input through said image data input means; and
density increasing means for increasing said predetermined density of said output image data back to said original density.

9. A system as defined in claim 7, wherein said signal output means calculates said distance value using a formula V=255−(255×d/6), wherein V is a density value of said object pixel and d is a distance from said object pixel to said peripheral pixel determined as part of said character area by said determination means.

10. A system as defined in claim 7, wherein said character area includes a part which is a cluster area of a black pixel.

11. A system as defined in claim 7, wherein said character area includes a part which is an edge area.

12. A system as defined in claim 7, wherein said character area includes a part which is a ridge area of character.

13. An image processing apparatus, comprising:
an image data input configured to receive input image data and process input image data in a unit of pixels;
a character pixel area detector configured to analyze and determine whether surrounding pixels close to an object pixel are part of a character area;
a distance calculator configured to calculate a distance value from said object pixel to said surrounding pixels determined as part of said character area by said determination means; and
a signal output configured to output a multiple value signal for representing a feature of said object pixel as a character based on said distance value calculated by said distance calculation.

14. An image recognition apparatus as defined in claim 13, further comprising:
a first density converter configured to decrease an original density of said input image data to a predetermined density after said input image data is input through said image data input; and
a second density converter configured to increase said predetermined density of said output image data back to said original density.

15. An image recognition apparatus as defined in claim 13, wherein said signal output calculates said distance value using a formula V=255−(255×d/6), wherein V is a density value of said object pixel and d is a distance from said object pixel to said peripheral pixel determined as part of said character area by said character pixel area detector.

16. An image recognition apparatus as defined in claim 13, wherein said character area includes a part which is a cluster area of a black pixel.

17. An image recognition apparatus as defined in claim 13, wherein said character area includes a part which is an edge area.

18. An image recognition apparatus as defined in claim 13, wherein said character area includes a part which is a ridge area of character.

19. An image processing system, comprising:
an image recognition mechanism configured to analyze input image data, recognize a characteristic of an image represented by said input image data, and output output image data; and
a data processor configured to process output image data in accordance with said recognized characteristic,
wherein said image recognition mechanism includes:
an image data input configured to receive input image data and process input image data in a unit of pixels;
a character pixel area detector configured to analyze and determine whether surrounding pixels close to an object pixel are part of a character area;
a distance calculator configured to calculate a distance value from said object pixel to said surrounding pixels determined as part of said character area by said character pixel area detector; and
a signal output configured to output a multiple value signal for representing a feature of said object pixel as a character based on said distance value calculated by said distance calculator.

20. A system as defined in claim 19, further comprising:
a first density converter configured to decrease an original density of said input image data to a predetermined density after said input image data is input through said image data input means; and a second density converter configured to increase said predetermined density of said output image data back to said original density.

21. The system as defined in claim 19, wherein said signal output calculates said distance value using a formula V=255−(255×d/6), wherein V is a density value of said object pixel and d is a distance from said object pixel to said peripheral pixel determined as part of said character area by said character pixel area detector.

22. A system as defined in claim 19, wherein said character area includes a part which is a cluster area of a black pixel.

23. A system as defined in claim 19, wherein said character area includes a part which is an edge area.

24. A system as defined in claim 19, wherein said character area includes a part which is a ridge area of character.

25. An image processing method, comprising the steps of:

inputting image data;

processing said input image data in a unit of pixels;

analyzing and determining whether surrounding pixels close to an object pixel are part of a character area;

calculating a distance value from said object pixel to said surrounding pixels determined as part of said character area by said analyzing and determining step; and outputting a multiple value signal representing a feature of said object pixel as a character based on said distance value calculated by said calculating step.

26. The method as defined in claim 25, further comprising the steps of:

decreasing an original density of said input image data to a predetermined density after said input image data is input through said image data inputting step; and increasing said predetermined density of said output image data back to said original density.

27. A method as defined in claim 25, wherein said calculating step calculates said distance value using a formula V=255−(255×d/6), wherein V is a density value of said object pixel and d is a distance from said object pixel to said peripheral pixel determined as part of said character area by said analyzing and determining step.

28. A method as defined in claim 25, wherein said character area includes a part which is a cluster area of a black pixel.

29. A The method as defined in claim 25, wherein said character area includes a part which is an edge area.

30. A method as defined in claim 25, wherein said character area includes a part which is a ridge area of character.

* * * * *